Feb. 1, 1966   R. GILMONT   3,232,117
MICROMETER BURET
Filed Sept. 14, 1962
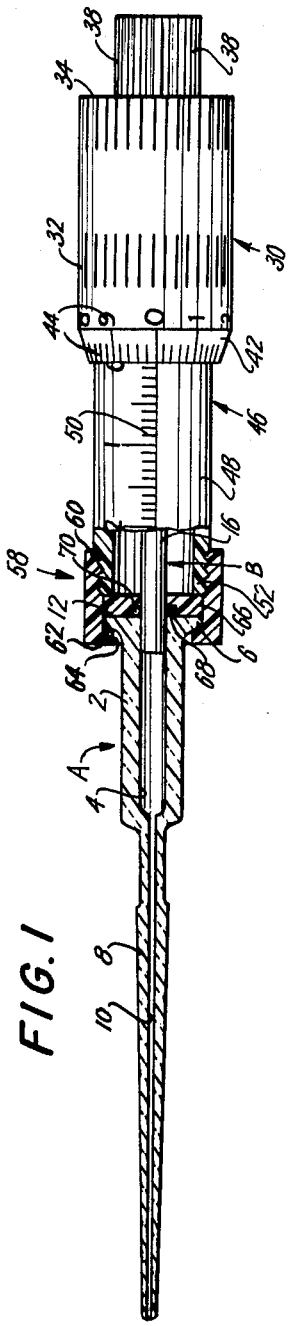
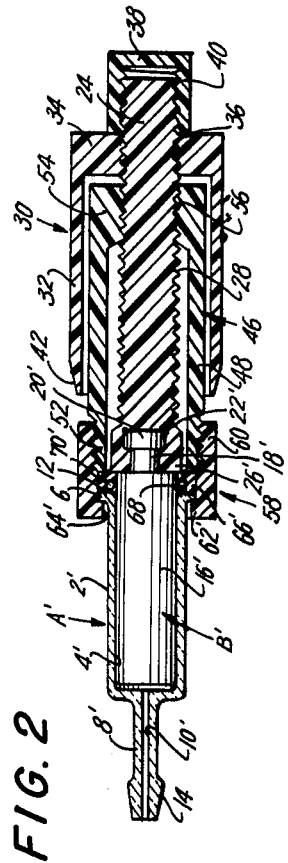
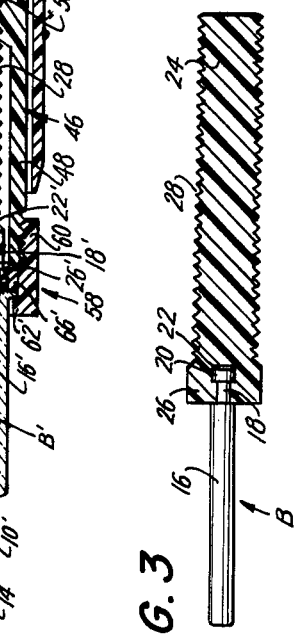
INVENTOR.
ROGER GILMONT
BY
James and Franklin
ATTORNEY

United States Patent Office 3,232,117
Patented Feb. 1, 1966

3,232,117
MICROMETER BURET
Roger Gilmont, Douglaston, N.Y., assignor to Roger Gilmont Instruments, Inc., Great Neck, N.Y., a corporation of New York
Filed Sept. 14, 1962, Ser. No. 223,616
4 Claims. (Cl. 73—425.6)

The present invention relates to a device capable of measuring and dispensing quantities of liquid with high accuracy (that type of device hereinafter being generically termed a "buret"), and in particular to such a device which is inexpensive, highly precise, and readily maintained.

Several problems commonly arise in the use of burets, particularly in chemical or medical laboratories. Perhaps foremost among these are the problems of contamination and precision of measurement. A liquid which is used in the buret will usually tend to cling thereto, thus requiring that all parts of the buret be thoroughly cleaned after use, and when the liquid being measured contains bacteria or the like, the parts of the buret must also be sterilized before being used again. Conversely, the buret must be so constructed that it will not contaminate the liquid being measured. In order to produce an effective seal between the moving parts of the buret, thereby to ensure accurate liquid measurement, greases have been employed between those moving parts, and if any of the grease comes in contact with the liquid being measured, contamination may result.

Various structural arrangements for burets have been proposed which are designed to minimize the possibility of contamination, while at the same time permitting precise measurement of the liquid involved, but these have been characterized either by excessive complexity and hence high cost, or by a sacrifice of accuracy or of contamination-prevention, or both. Thus in many instances the use of grease for producing a proper seal has not been abandoned despite its tendency toward contamination of the liquid being measured, and in other instances the parts are assembled and disassembled only with great difficulty, are fragile, or are made of materials which cannot be sterilized in a satisfactory manner, as by being placed in an autoclave.

It is the prime object of the present invention to produce a buret which avoids the above disadvantages, which is capable of measuring liquids with a very high degree of precision without contaminating the liquid and without being contaminated thereby, and which accomplishes this by means of a structure which is simply, sturdy, relatively inexpensive, easily assembled and disassembled, and all the parts of which may be subjected to autoclave sterilization without damage. It is a further object of the present invention to accomplish the above results in connection with a buret the liquid measurement function of which is carried out in micrometer fashion.

In accordance with the present invention the liquid-containing and liquid-dispensing part of the buret comprises a glass tube in which a Teflon plunger is slidable, the glass tube and the plunger having a very close fit, thereby to produce an effective seal therebetween while still permitting the plunger to move axially within the tube. The plunger is moved axially within the tube by means of a micrometer-like structure including a rotary driving element attached to the plunger. The joint between the rotary driving element and the plunger permits the former to rotate freely on the latter, while the friction between the plunger and the glass tube within which it moves is usually sufficient to prevent the plunger from rotating. Consequently the plunger translates substantially completely with an axial sliding movement, while the rotary driving member rotates as well as moving axially. This permits the attainment of an exceptionally high degree of accuracy, eliminating the possibility of lost motion between the micrometer drive and the plunger arising from the twisting of any of the operative parts, and it further permits the attainment of an exceptionally effective seal between the plunger and the glass tube within which it moves, thus eliminating the necessity for the use of grease therebetween. A vacuum-tight seal is ensured between the plunger and the glass tube by means of an O-ring operatively connected therebetween and through which the plunger slides. This O-ring is preferably positioned at a point remote from the tip of the plunger, so that the liquid with which the buret is used will come in contact only with glass or Teflon. The O-ring is preferably formed of chemically resistant rubber in order not to be affected by cleaning solutions, in order to withstand autoclave sterilization, and in order not to be affected by any buret-measured liquids which may accidentally reach it.

To the accomplishment of the above, and to such other objects as may hereinafter appear, the present invention relates to the construction of a buret, as defined in the appended claims and as described in this specification, taken together with the accompanying drawings, in which:

FIG. 1 is a side elevational view, partially broken away and cross sectioned, of one embodiment of the present invention, utilizing a small bore glass tube with a long buret tip, the plunger being shown within the glass tube in its rearwardly withdrawn position;

FIG. 2 is a side cross sectional view of a second embodiment of the present invention, the right hand or micrometer end of which is substantially identical with the embodiment of FIG. 1, but which is provided with a large bore glass tube with a Luer-joint tip and with a correspondingly large size plunger, the plunger being shown in its forwardly projected position; and FIG. 3 is a side cross sectional view of the plunger and rotary driving member of the embodiment of FIG. 1.

The liquid-measuring and liquid-dispensing elements of the buret of the present invention comprise a glass tube generally designated A and a plunger generally designated B and formed of highly polymerized tetrahalogenated ethylene, such as the polytetrafluoroethylene sold by Du Pont Corporation under the trade name "Teflon." The glass tube A, in the specific design shown in FIG. 1, has a body portion 2 provided with a relatively narrow bore 4 which is very accurately dimensioned. A flange 6 is formed at one end of the body portion 2, the other end of the body portion 2 terminating in a tip 8 of pipet form which is quite elongated and which is provided with a narrow passage 10 communicating with the bore 4. The end surface 12 of the flange 6 is preferably smoothed and vacuum polished. The glass tube A' of FIG. 2 is essentially similar to the glass tube A of FIG. 1, except that its body portion 2' is provided with a comparatively large bore 4', and its tip portion 8', provided with passage 10', is shorter than the tip portion 8 of FIG. 1 and is provided at its end with a Luer joint 14 to permit quick and simple securement of hypodermic needles or other attachments thereto. It will be understood, of course, that the Luer joint tip part 8' of FIG. 2 could be used with the narrow bore body portion 2 of FIG. 1, and that the pipet type tip part 8 of FIG. 1 could be used with the large bore body portion 2' of FIG. 2, as desired, and that other changes in the specific design of the glass tubes A and A' could also be accomplished as desired.

The Teflon plunger B of FIG. 1 has a body portion 16 which is accurately dimensioned to fit snugly within the bore 4 of the glass tube body part 2. The external surface of the plunger body portion 16 is precision ground to proper size and shape and is matched to the internal dimension of the bore 4 so as to be a slidable fit therein, but with an appreciable amount of friction exerted therebetween. Diametrical dimensional tolerances of only a few ten-thousandths of an inch are involved. The fact that the body portion 2 is formed of glass and the plunger body portion 16 is formed of Teflon enables such a close fit to be produced without preventing axial sliding movement of the plunger part 16 within the bore 4 or requiring the use of lubricants such as grease if such sliding movement is to take place. The close engagement between the plunger part 16 of Teflon and the inner surface of the glass bore 4 defines a seal therebetween which effectively prevents the escape of liquid therebetween, and without requiring the use of an extraneous sealing means, such as grease.

The plunger B' of FIG. 2 has a body portion 16' which is essentially the same as the body portion 16 of the plunger B of FIG. 1, except that it makes the requisite fit with the enlarged bore 4' of the glass tube body portion 2'.

Each of the plungers B and B' is provided, at its right hand end as viewed in the drawings, with a neck 18 and an enlarged head 20 the right hand corners of which are beveled as at 22. A rotary driving member 24 is affixed thereto, as by being molded in situ thereon, the member 24 having a portion 26 which encompasses the parts 18 and 20 of the plunger B. The rotary driving member 24 is formed of high density polyethylene, and the nature of the joint between it and the plunger B is such as to permit the rotary member 24 and the plunger B to rotate relatively freely with respect to one another, the beveled corners 22 of the plunger B facilitating the attainment of this relationship. The external surface of the rotary member 24 is provided with an accurate screw thread 28.

A sleeve 30 is provided with a skirt portion 32 and with a hub portion 34, the latter having an internally threaded opening 36 through which the rotary driving member 24 is threadedly received. A lock nut 38 has an internally threaded opening 40 into which the outwardly projecting end of the rotary driving member 24 is adapted to be received, the lock nut 38 permitting the sleeve 30 to be adjustably axially positioned relative to the rotary driving member 24 and then locked in position. The left hand end of the skirt 32 is provided with a beveled surface 42 on which circular micrometer graduations 44 are provided. The sleeve 30 and lock nut 38 may be formed of polypropylene.

A barrel 46 is provided with a body portion 48 provided with axial micrometer-type graduations 50 adapted to cooperate with the left hand edge of the sleeve 30 and the circular graduations 44 thereon. The left hand end of the barrel 46 has an externally threaded portion 52 and the right hand end thereof has an endwall 54 provided with an internally threaded passage 56 through which the rotary driving member 24 extends in threaded engagement. A nut 58 is provided with an internally threaded body portion 60 within which the portion 52 of the barrel 46 is received, and is further provided with an end wall 62 having a central passage 64. The body portion 2 of the glass tube A extends through the passage 64, the flange 6 of the tube A resting on the wall 62. It is there held in place by the barrel 46, a washer 66 being interposed therebetween. The barrel 46 and nut 58 are formed of polypropylene, and the washer 66 is formed of polytetrafluoroethylene (Teflon) or other material similar to that of which the plunger 16 is formed. The washer 66 is preferably provided with a recess 68 in which an O-ring 70 is received, the O-ring being compressed so as to engage the radially outer surface of the plunger body part 16 and the axial end surface 12 of the glass tube A, thereby to produce a vacuum-tight seal between the plunger B and the glass tube A. The O-ring 70 is preferably formed of a chemically resistant rubber which is also heat resistant, so that it can be subjected to autoclave sterilizing procedures. One such rubber is the fluorinated synthetic rubber sold by Du Pont Corporation under the tradename "Viton."

Because of the appreciable amount of friction between the plunger B and the inner surface of the bore 4 with which it cooperates, and because of the relatively free rotary connection between the driving member 24 and the plunger B, rotary movement of the driving member 24 relative to the stationary barrel 46 will cause the plunger B to move back and forth within the bore 4 substantially only with a rectilinear movement, and without any rotation. Consequently the relative rotation of the driving member 24 with respect to the barrel 46, as converted by the threaded interengagement therebetween, will accurately determine the axial position of the plunger B within the bore 4, and hence will accurately determine the volume within the bore 4 to the left of the tip of the plunger B—none of the rotation of the element 24 relative to the barrel 46 is lost in torsion of any part, but instead all of that rotation is translated into axial movement of the plunger B. The close fit between the plunger B and bore 4 provides an effective seal against the liquids with which the device is to be used, and the O-ring 70 provides an airtight seal.

In use the instrument is filled as a conventional syringe except that the plunger B is operated through rotary movement of the sleeve 30 rather than by the push-pull motion of the ordinary syringe. With the plunger B moved all the way to the left as viewed in the drawings (see FIG. 2) the tip portion 8 or 8' is immersed beneath the surface of the liquid to be used and the sleeve 30 is then rotated so as to move the plunger B to the right and thus suck liquid into the bore 4. Trapped air is eliminated by placing the instrument in a vertical position and turning the sleeve 30 in the opposite direction, thereby moving the plunger forwardly until all of the air has been expelled from the bore 4 and the passage 10. Thereafter the tip portion 8 is returned to the liquid and the sleeve 30 again rotated to further retract the plunger B past the zero position as indicated by the micrometer type graduations 44 and 50. The sleeve 30 is then rotated back to its zero position, excess liquid is wiped from the tip 8, and the device is then ready to dispense accurately measured amounts of the liquid, the magnitude of the dispensed amounts being determined by the graduations 44 and 50. For example, in a buret having an 0.2 ml. capacity, such as the embodiment of FIG. 1, each division 44 on the sleeve 30 corresponds to 0.0002 ml. and each division 50 on the barrel 48 corresponds to 0.01 ml., this latter amount representing one complete rotation of the sleeve 30 and the driving member 24. For a 2.0 ml. device, such as that disclosed in FIG. 2, each division 44 on the sleeve 30 can represent 0.002 ml. and each division 50 on the barrel 48 can represent 0.1 ml.

If the zero position of the graduations 44 and 50 does not properly correspond to the position of the plunger B within the bore 4, the plunger B is brought to its proper position, the lock nut 38 is backed off, the sleeve 30 is rotated to bring it to its proper zero indicating position, and the lock nut 38 is again tightened.

Since the liquid with which the buret of the present invention is used will contact only glass or Teflon, it will not be contaminated by the buret parts, provided those parts are properly cleaned, and the buret parts will not be contaminated by it. The buret parts are very readily cleaned merely by unscrewing the nut 58 from the barrel 46, this permitting disassembly of the glass tube A from the plunger B and removal of the washer 66 and O-ring 70 from the plunger B. The barrel 46 may be unscrewed from the driving member 24 if desired. All of the disassembled parts may be cleaned in usual manner with a suitable detergent. They may also be sterilized if necessary, as by being placed within an autoclave, since all of the parts are made of materials which are appropriately heat-resistant.

From the above it will be seen that, despite the simplicity and relative inexpensiveness of the construction under discussion, a very high degree of accuracy is attainable therewith. Moreover, the construction is such as not to be adversely affected by, nor to adversely affect, the liquids with which the device is used. Cleaning and sterilization, and the assembly and disassembly of parts attendant thereon, are readily accomplished without damage or deterioration.

While but a limited number of embodiments of the present invention have been here specifically disclosed, it will be apparent that many variations may be made therein, all within the scope of the instant invention, as defined in the following claims.

I claim:

1. A buret comprising a glass tube having a bore communicating at one end with an exit orifice and having an opening at its other end, a plunger of polyhalogenated ethylene passing through said opening and slidable in said bore, the exterior of said plunger and the interior of said bore being of closely the same size and shape so as to engage one another entirely around said plunger with a sliding liquid-tight seal, mounting means for supporting said tube and said plunger, and means on said mounting means for moving said plunger forwardly and rearwardly through said bore, a portion of said plunger extending out beyond the end of said tube, an O-ring surrounding said plunger portion, and means for pressing said O-ring simultaneously against said plunger portion and said end of said tube.

2. The buret of claim 1, in which said pressing means includes a washer of polyhalogenated ethylene through which said plunger passes.

3. A buret comprising a glass tube having a bore communicating at one end with an exit orifice and having an opening at its other end, a plunger of polyhalogenated ethylene passing through said opening and slidable in said bore, the exterior of said plunger and the interior of said bore being of closely the same size and shape so as to engage one another entirely around said plunger with a sliding liquid-tight seal, mounting means for supporting said tube and said plunger, and means on said mounting means for moving said plunger forwardly and rearwardly through said bore, the rearward end of said plunger being provided with a head, said means for moving said plunger comprising a plastic member molded in situ around said head and having a body in screw-threaded engagement with said mounting means, a comparatively freely rotating joint being defined between said member and said plunger, said plunger and said tube engaging one another with sufficient friction to prevent said plunger from being driven in rotation by said member, a portion of said plunger extending out beyond an end of said tube, an O-ring surrounding said plunger portion, and means for pressing said O-ring simultaneously against said plunger portion and said end of said tube.

4. The buret of claim 3, in which said pressing means includes a washer of polyhalogenated ethylene through which said plunger passes.

References Cited by the Examiner
UNITED STATES PATENTS

| | | | |
|---|---|---|---|
| 2,080,629 | 5/1937 | Myracle | 73—425.6 |
| 2,660,342 | 11/1953 | Ruf. | |
| 2,935,365 | 5/1960 | Dega | 277—165 |
| 2,946,486 | 7/1960 | Gilmont | 73—425.6 X |
| 3,040,931 | 6/1962 | Sanz. | |

RICHARD C. QUEISSER, *Primary Examiner.*

DAVID SCHONBERG, *Examiner.*